(12) United States Patent
Henry

(10) Patent No.: US 12,485,421 B2
(45) Date of Patent: Dec. 2, 2025

(54) DROPLET GENERATOR AND GENERATION METHOD

(71) Applicant: LIGHTCAST DISCOVERY LTD, Cambridge (GB)

(72) Inventor: Isaac Thomas Henry, Cambridge (GB)

(73) Assignee: Lightcast Discovery Ltd, Cambridge (GB)

( * ) Notice: Subject to any disclaimer, the term of this patent is extended or adjusted under 35 U.S.C. 154(b) by 929 days.

(21) Appl. No.: 17/286,195

(22) PCT Filed: Oct. 16, 2019

(86) PCT No.: PCT/GB2019/052956
§ 371 (c)(1),
(2) Date: Apr. 16, 2021

(87) PCT Pub. No.: WO2020/079434
PCT Pub. Date: Apr. 23, 2020

(65) Prior Publication Data
US 2021/0387196 A1 Dec. 16, 2021

(30) Foreign Application Priority Data
Oct. 18, 2018 (EP) .................................... 18201162

(51) Int. Cl.
*B01L 3/00* (2006.01)
*G01N 21/64* (2006.01)

(52) U.S. Cl.
CPC ..... *B01L 3/502792* (2013.01); *B01L 3/50273* (2013.01); *B01L 3/502761* (2013.01); *G01N 21/645* (2013.01); *B01L 2200/0605* (2013.01); *B01L 2200/0647* (2013.01);
(Continued)

(58) Field of Classification Search
None
See application file for complete search history.

(56) References Cited

U.S. PATENT DOCUMENTS

2006/0194331 A1 8/2006 Pamula et al.
2010/0096266 A1 4/2010 Kim et al.
(Continued)

OTHER PUBLICATIONS

International Search Report issued Nov. 11, 2019 in corresponding PCT Application No. PCT/GB2019/052956.
(Continued)

*Primary Examiner* — Hoon K Song
(74) *Attorney, Agent, or Firm* — Porter Wright Morris & Arthur LLP

(57) ABSTRACT

A method of generating droplets from a liquid sample is described and is characterised by the steps of a) locating the sample at a first electrowetting location and applying an electrowetting force to cause a region of the sample to become elongated in a direction in which the electrowetting force is applied; b) temporarily altering the electrowetting force on the sample and accumulating electrostatic surface charge on the sample to counter surface tension forces between the bulk of the sample and the elongated sample region; c) restoring the electrowetting force; d) further elongating the charged elongated sample region using the electrowetting force and e) severing a droplet from the charged elongated sample region. A corresponding droplet generator is also described.

4 Claims, 2 Drawing Sheets

(52) U.S. Cl.
CPC ... *B01L 2200/10* (2013.01); *B01L 2300/0663* (2013.01); *B01L 2400/0427* (2013.01)

(56) References Cited

U.S. PATENT DOCUMENTS

| | | | |
|---|---|---|---|
| 2013/0293246 A1* | 11/2013 | Pollack | B41J 2/04555 |
| | | | 324/663 |
| 2015/0174578 A1 | 6/2015 | Srinivasan et al. | |
| 2018/0217370 A1* | 8/2018 | Malone | G02B 26/005 |
| 2018/0284423 A1* | 10/2018 | Huang | C12Q 1/6851 |

OTHER PUBLICATIONS

Written Opinion of the International Searching Authority issued Nov. 11, 2019 in corresponding PCT Application No. PCT/GB2019/052956.

Extended European Search Report issued Dec. 5, 2018 in corresponding European Patent Application No. 18201162.7.

Zhou et al., "Electrostatic charging and control of droplets in microfluidic devices", Lab on a Chip, vol. 13, No. 5, Dec. 13, 2012, pp. 962-969, 8 pages.

* cited by examiner

DROPLET GENERATOR AND GENERATION METHOD

This invention relates to a method for generating droplets from a larger liquid sample and a droplet generator employing the said method.

Microfluidic devices which rely on the generation and manipulation of droplets, especially microdroplets, are increasingly becoming a focus for technological application; especially in biomedical devices. This is in part because many thousands of such droplets can reliably be steered through the various components of the device using a multiplicity of electrowetting pathways. In one version of such devices, the droplets may be generated from a liquid sample flowing along a microfluidic pathway which culminates in a droplet head which discharges them into an immiscible carrier medium. By such means, aqueous droplets can, for example, be discharged into a carrier such as a fluorocarbon, hydrocarbon or silicone oil. Thereafter, the droplets can be moved away from the head using a network of electrodes applying electrowetting propulsive forces. In such devices a fluidic constriction such as a shaped orifice or a narrow channel is required in order to sever the droplet from the continuous bulk flow through the application of hydrodynamic shear forces.

Where droplets are to be manipulated using electrowetting forces, it becomes attractive to replace the droplet head and generate the droplets directly from the sample medium using electrowetting forces rather than the shear forces mentioned above. This approach has the additional advantage in certain circumstances of being able to obviate the need for a liquid carrier so that the droplet can simply be generated and manipulated in air or an inert gas such as nitrogen. Langmuir 5 (1989) p 376 and web publications D01:10.1002/anie.200503540 and D01:10.1002/elps.201600276 disclose electrowetting and electrostatic techniques applied to droplets.

However, generating droplets using electrowetting splitting can be problematic. First, there is a relatively narrow set of physical constraints determined by the materials employed and the microfluidic dimensions of the droplet generator in which splitting takes place. For example, in certain double-sided EWOD configurations a constraint may be placed on the conditions for splitting a droplet using electrowetting forces because it is necessary for the droplet to be confined between two parallel plates in order to be split through a stretching action. For a given electrowetting force, the smallest volume of droplet that can be split shrinks as the spacing between the confinement plates decreases. There is an advantage, therefore, in minimising the plate spacing in the electrowetting device in order to allow splitting of small daughter droplets with a limited electrowetting force. However, in certain systems it is advantageous to use the electrowetting system to transport microparticles, cells, organoids and other objects in the liquid which may not physically fit in to closely spaced plates. Importantly, there is always an upper limit to the amount of electrowetting force which can be applied to the sample for the purpose of elongating a region. This limit is imposed by physical effects such as contact angle saturation, surface fouling and dielectric breakdown which exist in all practical electrowetting liquid transport systems. The finite nature of the amount of electrowetting force that can be applied in a system is problematic because, during the elongation, the surface tension of the sample medium continuously acts in opposition thereby necessitating the need to apply a progressively increasing electrowetting force. Counteracting this surface tension effect is therefore critical if a stream of many thousands of droplets is to be generated reliably without needing to use extremely narrowly spaced plates that constrain the utility of the device for manipulating samples containing particles or cells.

We have found that this problem can be overcome by a method in which cycles of electrowetting forces and electrostatic charge are applied to a region of the sample until such time as the region has undergone sufficient elongation for a droplet to be severed without causing simultaneous break-up of the sample. The electrostatic charge accumulated on the surface of the droplet acts to counteract the surface tension through like-charge repulsion; allowing for more stretching and elongation than can be otherwise achieved on an uncharged droplet. Thus, according to a first aspect of the invention there is provided a method of generating droplets from a liquid sample characterised by the steps of:

a) locating the sample at a first electrowetting location and applying an electrowetting force to cause a region of the sample to become elongated in a direction in which the electrowetting force is applied;
b) temporarily altering the electrowetting force on the sample and accumulating electrostatic surface charge on the sample to counter surface tension forces between the bulk of the sample and the elongated sample region;
c) restoring the electrowetting force;
d) further elongating the charged elongated sample region using the electrowetting force and
e) severing a droplet from the charged elongated sample region.

The method of the invention has the advantage that by applying one or more cycles of charging and elongation microdroplets having dimensions in the range less than 1 millimetre, suitably less than 25 microns, can be easily and progressively drawn out of the sample. In addition, the method is also especially useful in situations where the electrowetting forces are generated optically using light impinging on a semiconductor layer; see for example U.S. Pat. Nos. 6,958,132 and 7,727,771.

In one embodiment, steps (a) to (d) are repeated multiple times until sufficient elongation of the sample region has occurred for step (e) to take place.

Suitably, the method of the invention further comprises the step (f) of transporting the severed droplet away from the first location along a pathway comprised of the first location and at least one second electrowetting location. In one embodiment, steps (a) to (f) are repeated multiple times to portion the sample into a stream of droplets each of equal volume which can be transported away from the parent sample and subsequently filled with material such as the analyte under investigation and any ancillary chemicals and marker molecules required; for example biological probes which generate characteristic fluorescence. Analytes suitable for investigation in such droplets include but are not limited to biological material such as organoid structures; cells; biomolecules such as proteins and polynucleotides derived from naturally-occurring DNA or RNA and functionalised microparticles such as polymer beads to which target biomolecules and/or markers can or have been attached.

The various locations employed in the method of the invention are electrowetting locations and can in one embodiment be comprised of regions on a dielectric surface which overlay electrodes attached to a drive circuit providing an alternating voltage and thus generating the electrowetting force. Alternatively, these electrowetting locations may comprise virtual electrode locations generated transiently in a semiconductor layer located underneath a transparent dielectric surface by means of the impingement of electromagnetic radiation. In yet another embodiment, the electrowetting forces arise from an AC voltage directed to a specific set of electrowetting locations by means of either externally switching the alternating voltage to a specific electrode or by directing the alternating voltage by means of a semiconductor zone activated by the impingement of electromagnetic radiation. The latter then acts to direct an external voltage source applied across the device by means of a continuous planar electrode. In one embodiment, multiple regions are progressively elongated out of a single parent sample so that multiple daughter droplets or stream of daughter droplets can be created by splitting simultaneously.

In step (a) of the method of the invention the parent liquid sample is located at the first location and an electrowetting force is applied to a region of the sample to cause elongation in a given direction away from the sample bulk. In one embodiment, this electrowetting force is provided by means of a drive circuit as explained above including an electrode at or adjacent to the first location to which is applied a sinusoidal AC drive voltage having no DC component. As also mentioned above, the electrodes used to apply this force may either be real or virtual.

Suitably, in step (b) the drive voltage at the first location is temporarily altered so that the parent liquid sample may be caused to accumulate significant electrostatic surface charge. This temporary alteration may comprise complete removal of the drive voltage or a significant reduction in its intensity. In one embodiment, this electrostatic charging is achieved by applying or overlaying a constant or monotonically-increasing DC charging voltage to the sample at this time. The optimal duration of the interruption of the electrowetting force in order to allow charging of the liquid interface is determined by underlying physical parameters. These include the viscosity of the liquid being dropletised, the viscosity of the surrounding media (liquid or gas), the coefficient of friction between the fluidics and the electrowetting substrates and the surface tensions in the system which exist between the two immiscible fluids and on the fluid-substrate interfaces. All of these parameters interact to yield a characteristic relaxation time for the process of the droplet retreating back into the parent liquid sample driven through the force of surface tension. If the time spent charging the droplet is substantially less than this characteristic relaxation time, the interface will become fully charged before the droplet has relaxed back in to the parent liquid reservoir due to the temporary interruption of the electrowetting force. In one embodiment, the duration of the charging voltage application lasts from about 10 to 100 milliseconds. In another embodiment, the sample is progressively charged electrostatically to a degree which is less than the Rayleigh limit for the sample medium employed. By this means, it is ensured that the sample remains intact whilst the electrowetting force is being applied. In certain applications however, where the droplet contains the analyte in the form of biological cells it may be convenient to charge the droplet at the outset beyond the Rayleigh limit to lyse or otherwise disrupt the cellular membranes thereby allowing their contents to be released.

In one embodiment, the temporary alteration of the drive voltage and application of the charging voltage is controlled by a microprocessor using pre-determined algorithms.

The method of the invention can also be made manifest as hardware suitable for generating droplets for a range of uses including but not limited to those described above. Thus, according to a second aspect of the invention there is provided droplet generator characterised by comprising:
a first electrowetting location adapted to receive a liquid sample;
at least one second electrowetting location arranged so that the first and second electrowetting locations define a pathway along which droplets severed from the sample can be transported using directional electrowetting forces;
an AC drive circuit arranged at the first electrowetting location and comprised of either an electrode and an associated AC electrical circuit or a semiconductor zone activated by the impingement of electromagnetic light thereon and
a DC charging circuit arranged at the first electrowetting location and adapted to electrostatically charge the surface of the sample.

In one embodiment, the droplet generator further comprises a control circuit for switching between the drive and charging circuits which are suitably AC and DC circuits respectively. In another embodiment, the droplet generator further comprises an analyser for analysing the contents of each droplet produced. For example, this may comprise a zone through which each droplet can be passed in turn and interrogated by light from a source such as a laser or LED. This analyser may further comprise a detector for detecting for example, fluorescence emitted by the droplets, or uv or infra-red radiation absorbance at one or more chosen wavelengths. This enables the droplet generator to be used for example to detect biological molecules which have been labelled with for example a fluorescing marker or stain.

The droplet generator described herein is especially useful for carrying out droplet-based nucleic acid sequencing methods such as described in our earlier patents or for high-throughput analysis of samples with a view to detecting the presence of bacterial or viral infections, cancers and other genetic diseases or abnormalities in mammalian medical samples; blood, plasma, sputum, urines and tissue biopsies. It is also especially useful for forming droplets containing cells, organoids or microparticles which can be manipulated on the electrowetting platform for the purposes of performing assays of cellular function, cellular interaction with chemicals such as drugs, stimulants and metabolic substrates, interactions between cells and cell lysis.

The invention is now illustrated with reference to the following.

An optically-activated electrowetting substrate of the type described in our earlier patent application (PCT/EP2018/066573) was employed. It comprised top and bottom glass plates each 500 µm thick and coated with transparent layers of conductive Indium Tin Oxide (ITO) having a thickness of 130 nm. Each layer was connected to an A/C drive circuit and a DC charging circuit. One of the plates was coated with an intermediate layer of amorphous silicon which was 800 nm thick. Both plates were then coated with 160 nm thick layers of high purity alumina which in turn were coated with an 80 nm thick layer of Teflon AF to render the final surfaces in contact with the sample hydrophobic. The two plates were then spaced 20 µm apart using spacers and a liquid sample inserted.

At a given location where the sample was to be located, the silicon-containing plate was illuminated by an LED from beneath with visible light (wavelength 660 or 830 nm) at a level of 0.01 Wcm$^2$ in order to activate the desired electrowetting force via the drive circuit. The sample employed was comprised of an aqueous culture of immortalised cells in a growth medium.

Daughter droplets were then progressively drawn off of the sample by periodically interrupting application of the electrowetting force and replacing it with a ramped-up charging force supplied by the DC circuit in a series of alternating pulses at a pre-determined repetition rate. In the process, the sample was progressively elongated in the direction of the applied electrowetting force until such time as the daughter droplet was broken off. After break-off, the daughter droplet was moved away from the vicinity of the sample using pathways of other electrowetting structure arranged around the site holding the sample as explained in our earlier patent application.

This methodology was used to investigate the characteristics of the daughter droplet severance process in terms of minimum droplet size and break-off distance. The results are summarised in the following table which shows that using the method of the invention a substantial reduction in the minimum daughter droplet volume can be obtained whilst at the same time minimisation the elongation distance required to reach the point of break-off.

TABLE

| Pulsatile charging conditions | Number of dropletisation | Minimum volume detached | Shortest break-off distance |
|---|---|---|---|
| No charging | 7 | 12,000 pL | 1.1 mm |
| Ramp 0 to 100 V linear increase over 50 ms; 1 Hz repetition rate | 4 | 5,000 pL | 800 um |
| Ramp 0 to 30 V linear increase in 30 ms, 1 Hz repetition rate | 12 | 1,200 pL | 400 um |

Figure 1:
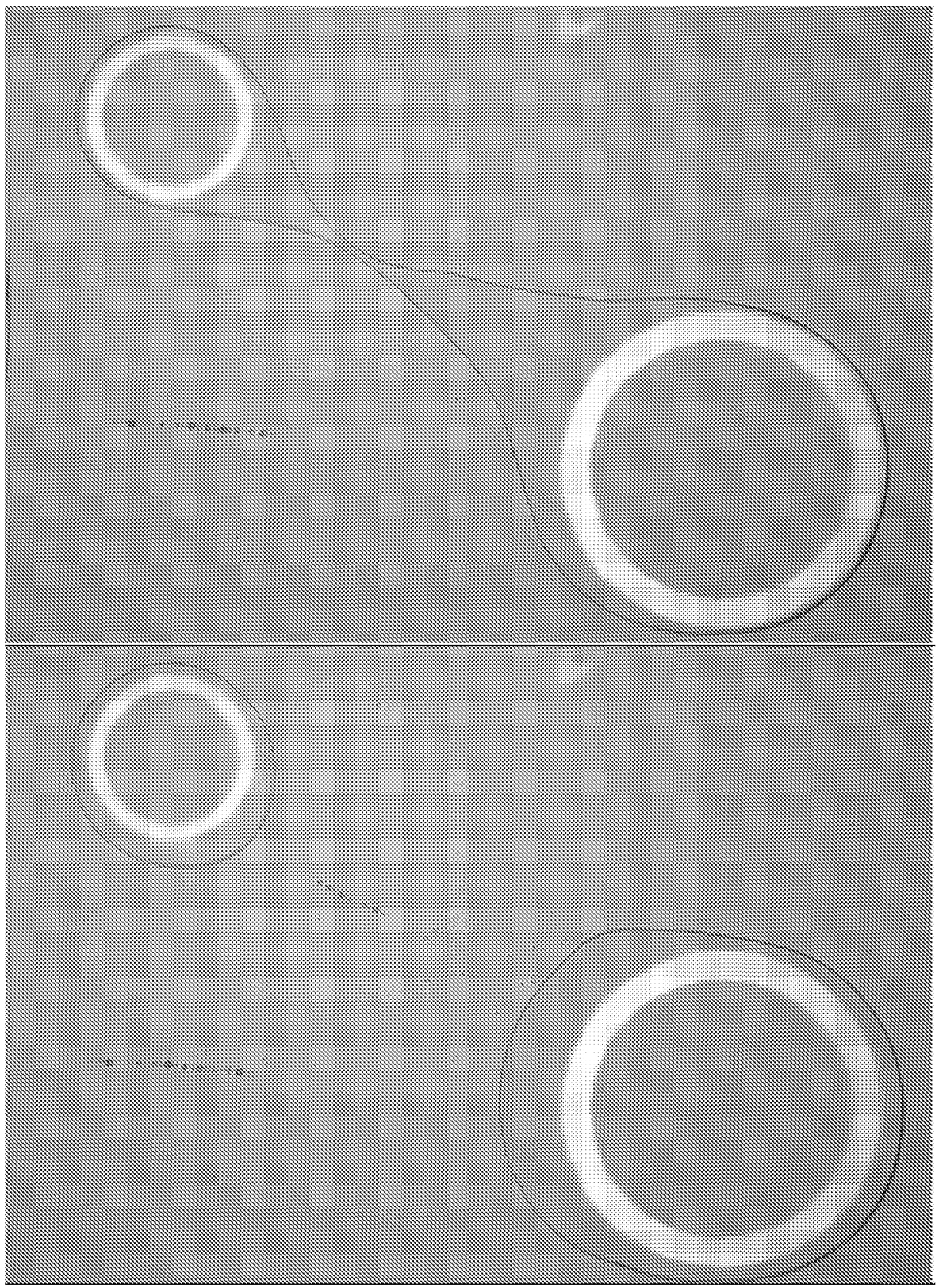
FIG. 1 is a pair of photomicrographs of a droplet being detached from the input liquid plug whilst under pulsatile charging.
Figure 2:
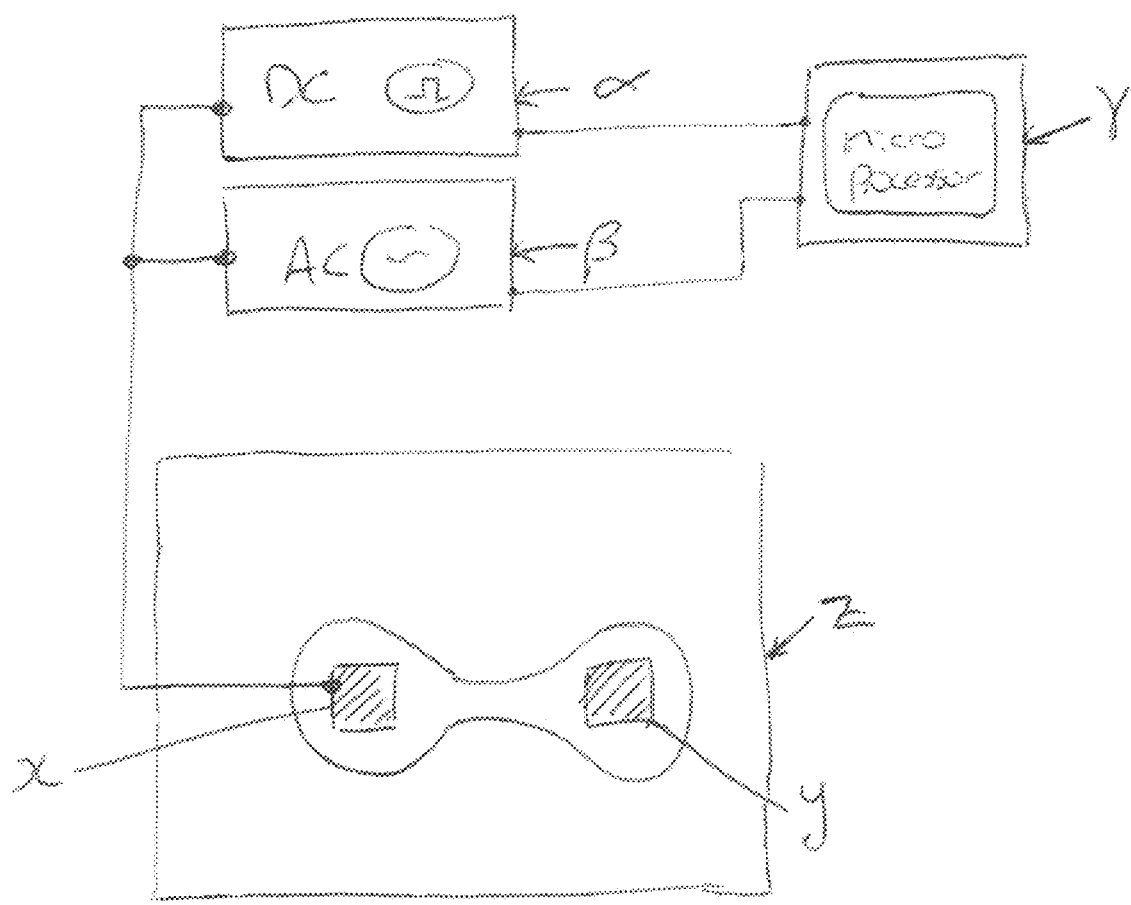
FIG. 2 depicts an embodiment of a droplet generator, wherein x is a first electrowetting location, y is a second electrowetting location, z is a sample, α is a DC charging circuit, β is an AC charging circuit, and γ is a microprocessor.

The invention claimed is:

1. A droplet generator comprising:
   a first electrowetting location adapted to receive a liquid sample;
   at least one second electrowetting location arranged so that the first and second electrowetting locations define a pathway along which droplets severed from the sample can be transported using directional electrowetting forces,
   an AC drive circuit arranged at the first electrowetting location and comprised of either an electrode and an associated AC electrical circuit or a semiconductor zone activated by the impingement of electromagnetic light thereon;
   a DC charging circuit arranged at the first electrowetting location and adapted to electrostatically charge the surface of the sample; and
   a microprocessor configured to control an AC drive voltage produced by the AC drive circuit and application of the DC charging voltage produced by the DC charging circuit using pre-determined algorithms.

2. The droplet generator of claim 1, further comprising a control circuit for switching between the drive and the charging circuits.

3. The droplet generator of claim 1, further comprising an analyser for analysing the contents of each droplet produced.

4. The droplet generator of claim 3, wherein the analyser is arranged to detect fluorescence emitted by the droplets when interrogated with electromagnetic radiation.

* * * * *